United States Patent [19]
Elliott

[11] Patent Number: 5,456,992
[45] Date of Patent: Oct. 10, 1995

[54] PROCESS FOR BATTERY RECYCLING

[76] Inventor: Kenneth W. Elliott, Plant 28 Invertose Dr., P.O. Box 6, Port Colborne, Ontario L3K 5V7, Canada

[21] Appl. No.: 326,633

[22] Filed: Oct. 20, 1994

[51] Int. Cl.$^6$ ................................................... H01M 10/54
[52] U.S. Cl. .............................. 429/49; 75/714; 266/115
[58] Field of Search ............................... 429/49; 75/714; 266/115

[56] References Cited

U.S. PATENT DOCUMENTS

| | | | |
|---|---|---|---|
| 2,726,972 | 12/1955 | Corral | 266/115 |
| 4,769,116 | 9/1988 | Olper et al. | 204/114 |
| 4,927,510 | 5/1990 | Olper et al. | 204/114 |
| 5,211,818 | 5/1993 | Moure, Jr. et al. | 204/114 |

OTHER PUBLICATIONS

1) Report entitled "Study into Recycling Portable Household Batteries", dated May, 1994, four pages.
2) News Release by NEMA headed "U.S. European, Japanese Battery Makers Say Existing Metals Industry Offers Recycling Opportunities for Used Household Batteries", dated May 11, 1994, two pages.

*Primary Examiner*—Stephen Kalafut
*Assistant Examiner*—Richard H. Lilley, Jr.
*Attorney, Agent, or Firm*—Dykema Gossett

[57] ABSTRACT

Household sealed cell alkaline and zinc carbon batteries may be recycled for use in steel making as follows. The batteries are pulverized then run through an acidic bath to neutralize the alkaline electrolyte. Next the materials are rinsed, then dried and mixed with granulated carbon steel typically in a ratio of 5 parts battery material to 95 parts granulated carbon steel. The mixture is compressed into briquettes for introduction into steel making furnaces.

7 Claims, 2 Drawing Sheets

PROCESS FOR BATTERY RECYCLING

BACKGROUND OF THE INVENTION

1. Field of the Invention

The present invention relates to a process and apparatus for recycling sealed cell zinc carbon and alkaline type batteries.

2. Description of the Related Art

Ninety-five percent of portable batteries are household batteries. The vast majority of these are sealed cell alkaline batteries. Once spent, most of these batteries are simply discarded and find their way to landfill sites.

A known method for recycling alkaline and zinc carbon batteries involves mechanically removing the casing from the battery cell and then using chemical processes to separate the solid materials of the cell. The three major solid components of the cells are zinc, carbon, and manganese. There are several problems with chemical separation processes. Firstly, the component materials involved are of low value while chemical processing is expensive. Also, additional waste streams are created with the chemical processes. In view of these drawbacks, this recycling method has not found wide spread use.

This invention seeks to overcome drawbacks of known zinc carbon and alkaline battery recycling processes.

SUMMARY OF THE INVENTION

According to the present invention, there is provided a process for recycling sealed cell zinc carbon and alkaline batteries comprising the steps of: pulverising at least one of sealed cell zinc carbon batteries and sealed cell alkaline batteries; bathing said pulverised batteries with acid; drying said bathed pulverised batteries; mixing said dried bathed pulverised batteries with granulated carbon steel to provide a mixture containing up to about 25% of said dried bathed pulverised batteries; and compressing said mixture into briquettes.

According to another aspect of the present invention, there is provided a process for preparing batteries of the type having a steel casing, carbon, manganese, and zinc metals, and an alkaline electrolyte for use in the making of steel, comprising the steps of: pulverising said batteries; bathing said pulverised batteries with acid in order to neutralize said alkaline electrolyte; after bathing, rinsing said pulverised batteries; after rinsing, drying said pulverised batteries; after drying, mixing said pulverised batteries with granulated carbon steel to provide a mixture containing up to about 25% of said pulverised batteries; and compressing said mixture into briquettes suitable for introduction into a steel making furnace.

BRIEF DESCRIPTION OF THE DRAWING

In the figures, which represent an example embodiment of the invention.

DETAILED DESCRIPTION OF THE PREFERRED EMBODIMENTS

A sealed cell alkaline battery comprises about 20% zinc, 20% manganese, and 20% carbon. Steel, primarily from the casing, comprises, approximately, a further 20% of the battery. The balance of the battery comprises the alkaline electrolyte and other components, such as paper and plastic. The composition of a sealed cell zinc carbon battery is similar.

Figure 1:
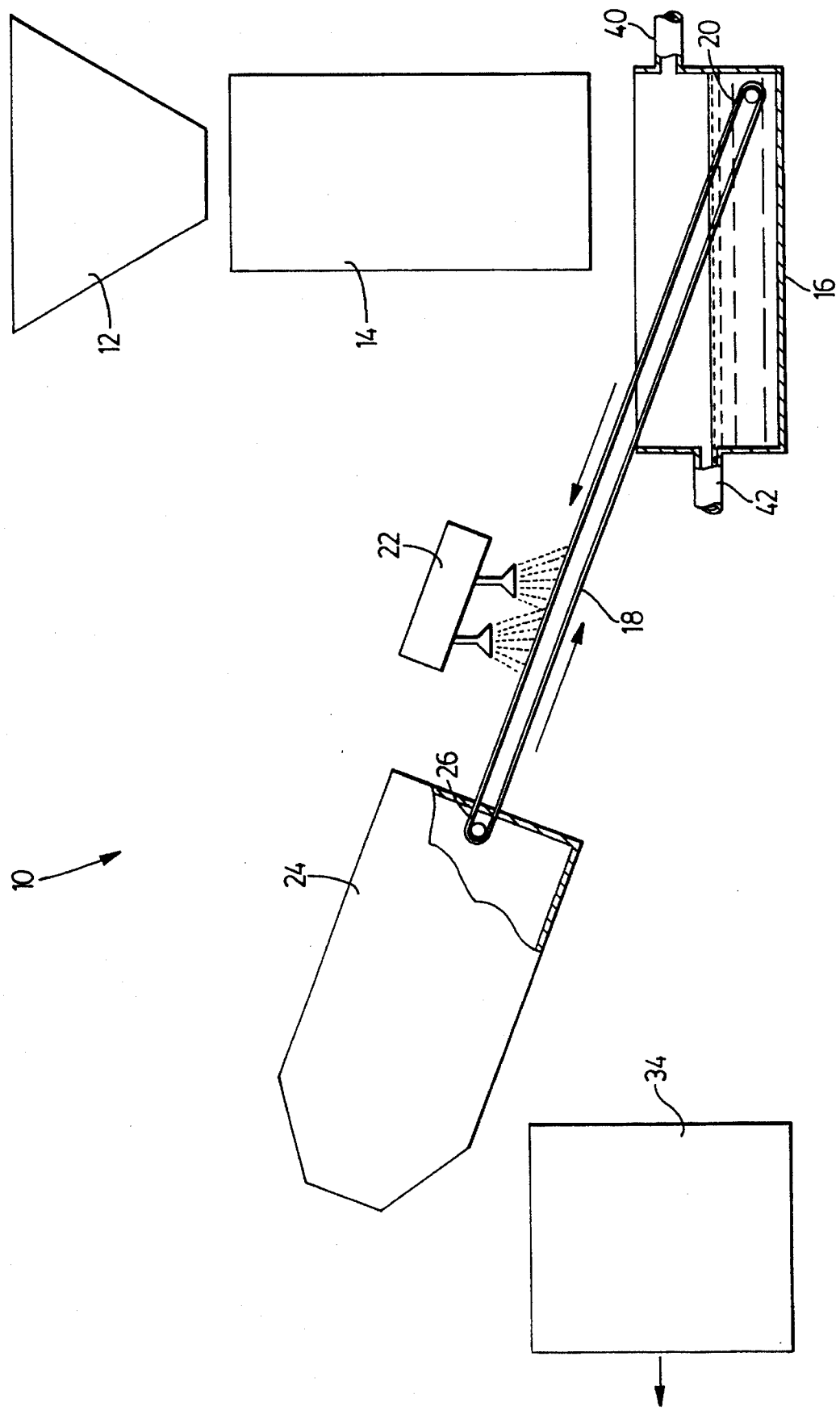
FIG. 1 is a schematic view of a portion of battery recycling apparatus made in accordance with the invention.

FIG. 1 shows the first stage 10 of apparatus for recycling zinc carbon and alkaline batteries. The batteries are placed in a hopper 12 which feeds them to a pulverizer in the nature of a grinding mill 14. The output of the grinding mill is positioned above an acidic bath 16. The bath 16 is provided with an acid feed inlet 40 and an effluent outlet 42. An inclined conveyor 18 has a lower upstream end 20 in acidic bath 16. The conveyor extends past a fresh water rinser 22 and into rotary dryer 24 at its raised downstream end 26. A collector 34 is positioned below the output end of drier 24.

Figure 2:
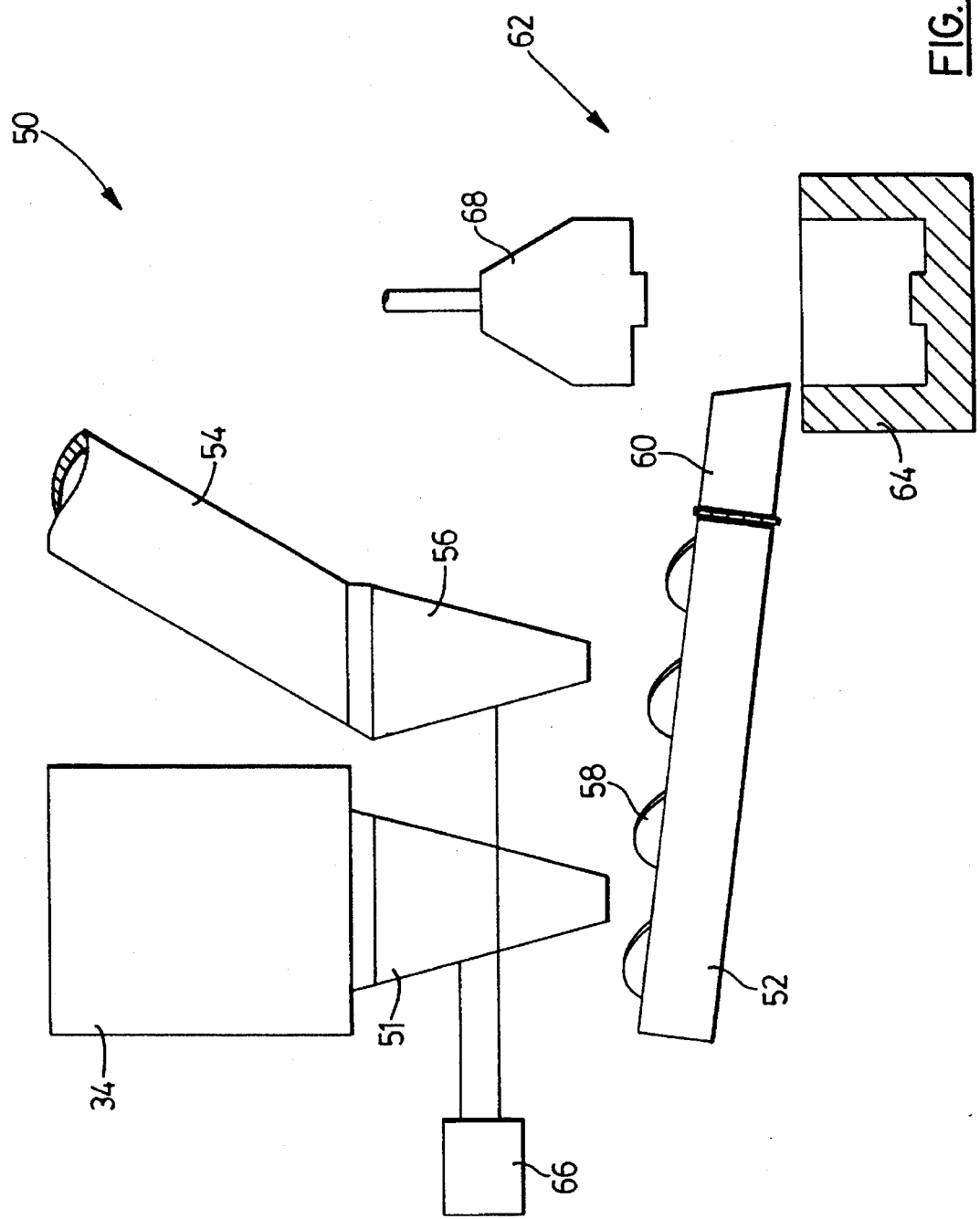
FIG. 2 is a schematic view of another portion of battery recycling apparatus made in accordance with the invention.

FIG. 2 shows the second stage 50 of apparatus for recycling alkaline batteries. Collector 34 is positioned over a hopper 51. Hopper 51 feeds to mixing conveyor 52. A chute 54 feeds a hopper 56 which also discharges to the mixing conveyor 52. The mixing conveyor comprises a conveying and mixing auger 58. The outlet 60 of the mixer 52 is hinged to the mixer body and may be directed to feed to cavity 64 of hydraulic press 62. The chute 60 may also be moved out of the way of hydraulic press 62. The press 62 has a ram 68 registered with cavity 64. A controller 66 controls the degree to which hoppers 51 and 56 are opened.

In operation, sealed cell alkaline and zinc carbon batteries are placed in hopper 12 which discharges them to grinding mill 14. The mill pulverizes the batteries and drops the pulverized batteries onto conveyor 18 in acidic bath 16. A constant flow is maintained through the bath with fresh acid feeding through inlet 40 and effluent leaving through outlet 42. The conveyor slowly conveys the pulverized batteries through the bath while the acid neutralizes the alkaline electrolyte of the batteries as it combines with the electrolyte to form a salt and water. As the pulverized batteries move downstream along the conveyor, they leave the bath 16 and pass under rinser 22 which sprays fresh rinse water onto them. The pulverized batteries are then discharged from the conveyor into drier 24 which dries them. The dried pulverised batteries drop from the outlet of the drier to a collector 34.

After a collector 34 has been filled, it may be positioned over hopper 51 and a trap door in the bottom of the collector opened so that the collector discharges to the hopper 51. Granulated carbon steel is supplied to chute 54 such that it discharges to hopper 56. Controller 66 controls the degree to which hoppers 50 and 56 are opened and thereby controls the rate of discharge of material from the hoppers to the mixer 52. The conveying and mixing auger 58 of the mixer rotates such that material falling into the mixer is transported toward outlet 60 and is mixed as well. With the outlet 60 directed toward hydraulic press 62, material exiting mixer 52 enters cavity 64 of the press. When the cavity 64 is full, chute 60 of the mixer is deflected out of the way and ram 68 of press 62 extends in order to compress material in cavity 64 into a briquette. The briquette is removed from the cavity and outlet 60 redirected toward the cavity so that it is filled once more. Two rams may be provided such that the cavity of one may be being filled while a briquette is being formed in the other.

The granulated carbon steel supplied to chute 54 may be steel turnings, drillings, granules or other small pieces of steel. This granulated steel may be purchased as "waste steel" in the marketplace. Granulated "waste" steel typically has a low carbon and manganese content.

The fact that sealed cell zinc carbon and alkaline batteries contain carbon and manganese suggests they might be useful in steel recycling since steel comprises iron and carbon along with some manganese (with the percentage of carbon and manganese increasing for harder steels). However, an attempt to utilize the pulverized batteries in collector 34 directly in a steel making furnace would be fraught with a number of difficulties. Firstly, in a steel making plant which feeds scrap steel to steel making furnaces, conventionally feedstock is moved from place to place by use of electromagnets. Pulverized batteries are substantially non-magnetic and, therefore, would not be amenable to conveying by this approach. However, once combined with carbon steel into the briquettes of this invention, the briquettes can by moved with electromagnets. Secondly, loose materials tend to flare off rather than combining with the furnace mixture for steel making. The compressed briquettes of the subject invention substantially avoid this difficulty. Further, steel mills which recycle scrap steel provide specifications for the steel feedstock they will purchase. Typically the feedstock is required to have no more than 4% carbon, 1¼% manganese, and 1% zinc. Direct use of pulverized batteries from the collector 34 would provide an additive which did not meet these specifications. With the subject invention, the controller 66 of FIG. 2 controls the ratio of battery material to carbon steel in the briquettes. The controller may be adjusted so that each briquette has about 95% granulated steel and 5% of battery material. With this setting, the amount of manganese, zinc, and carbon from the battery material will each be diluted to about 1% of the briquette, which is well within the noted specifications. Further, since the granulated steel which forms 95% of the briquette typically has a low carbon and manganese content and no zinc, the composite briquette will generally remain well within the noted specifications and so may be used directly in a steel making furnace.

Briquettes with greater than 5% battery material can also be used as feedstock, provided they are mixed into a load of ferrous feedstock such that the there is no more than 5% battery material in the load. The maximum percentage of battery material in a briquette is limited by the requirement that the battery material combine with the granulated steel. Combining occurs with up to about 25% of battery material in the briquette and so this is a practical limit for the percentage of battery material in the briquettes.

When the subject briquettes are introduced to a steel making furnace, the paper and plastic from the battery material incinerate and the zinc fumes off (zinc has a lower vaporization temperature than the temperature used in steel making). The zinc which finds its way into the baghouse dust is actually advantageous since steel makers send their baghouse dust to recyclers (for extraction of useful metals) and a lesser charge is paid for baghouse dust having a zinc component.

As of January, 1994, alkaline and zinc carbon battery makers avoid using mercury and cadmium in their batteries. Nevertheless, there are still older batteries which will have a heavy metals content. A very small percentage of batteries which incorporate such heavy metals may be tolerated in the subject process.

Modifications will be apparent to those skilled in the art and, therefore, the invention is defined in the claims.

What is claimed is:

1. A process for recycling sealed cell zinc carbon and alkaline batteries comprising the steps of:

pulverising at least one of sealed cell zinc carbon batteries and sealed cell alkaline batteries;

bathing said pulverised batteries with acid;

drying said bathed pulverised batteries;

mixing said dried bathed pulverised batteries with granulated carbon steel to provide a mixture containing up to about 25% of said dried bathed pulverised batteries; and compressing said mixture into briquettes.

2. The process of claim 1 including the step of rinsing said pulverised batteries after the step of bathing said pulverised batteries.

3. The process of claim 2 wherein said mixing step provides a mixture containing about 5% of said dried bathed pulverised batteries.

4. A process for preparing batteries of the type having a steel casing, carbon, manganese, and zinc metals, and an alkaline electrolyte for use in the making of steel, comprising the steps of:

pulverising said batteries;

bathing said pulverised batteries with acid in order to neutralize said alkaline electrolyte;

after bathing, rinsing said pulverised batteries;

after rinsing, drying said pulverised batteries;

after drying, mixing said pulverised batteries with granulated carbon steel to provide a mixture containing up to about 25% of said pulverised batteries; and compressing said mixture into briquettes suitable for introduction in a steel making furnace.

5. The process of claim 4 wherein said mixing step provides a mixture containing about 5% of said pulverised batteries.

6. Apparatus for preparing batteries of the type having a steel casing, carbon, manganese, and zinc metals, and an alkaline electrolyte for use in the making of steel, comprising the following:

a pulveriser;

an acid bath at an output of said pulveriser;

a rinsing station;

a drying station;

means to convey material output from said pulveriser through said acid bath, said rinsing station, and said drying station;

means to mix a controlled amount of granulated carbon steel with material output from said drying station; and a press associated with the output of said mixing means.

7. The apparatus of claim 6 wherein said pulveriser is a grinding mill.

* * * * *